UNITED STATES PATENT OFFICE.

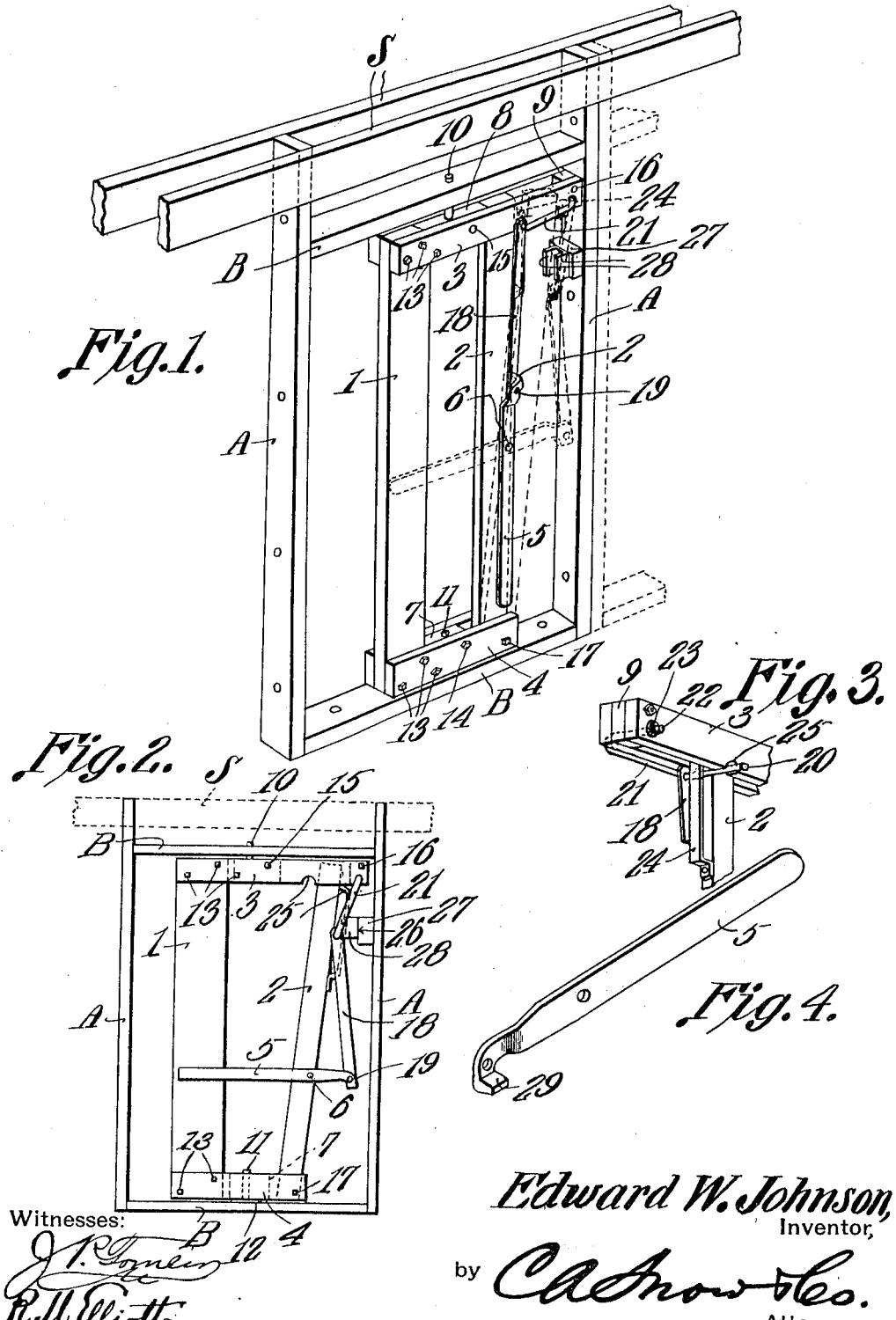

EDWARD W. JOHNSON, OF PORTVILLE, NEW YORK, ASSIGNOR TO SMITH PARISH AND B. T. FAIRCHILD, BOTH OF PORTVILLE, NEW YORK.

CATTLE-STANCHION.

1,020,354.  Specification of Letters Patent.  Patented Mar. 12, 1912.

Application filed December 21, 1910. Serial No. 598,570.

*To all whom it may concern:*

Be it known that I, EDWARD W. JOHNSON, a citizen of the United States, residing at Portville, in the county of Cattaraugus and State of New York, have invented a new and useful Cattle-Stanchion, of which the following is a specification.

This invention relates to cattle stanchions.

The object of the present invention is to improve and simplify the structure, to render it easier to operate by the animal and more positive in locking the animal against the possibility of backward movement, to improve the construction of the locking and releasing mechanism, and to strengthen the frame, thus to impart added stability to the structure as a whole.

A further object is so to construct the stanchion as to cause it to constitute a self-contained structure, that may be sold as an article of manufacture, and set up in a building and taken down at will, without disturbing the relative arrangement of its parts.

With the above and other objects in view, as will appear as the nature of the invention is better understood, the same consists in the novel construction and combination of parts, of a cattle stanchion, as will be hereinafter more fully described and claimed.

In the accompanying drawing forming a part of this specification, and in which like characters of reference indicate corresponding parts:—Figure 1 is a view in perspective of a cattle stanchion constructed in accordance with the present invention, showing the parts in position to lock the animal against backward movement. Fig. 2 is a view in front elevation, showing the position of the parts before the animal has been caught. Fig. 3 is a fragmentary detail view of a portion of the stanchion. Fig. 4 is a perspective detail view of the trigger.

Referring to the drawings, A—A designate two vertical beams, and B—B two horizontal beams, these four beams being connected to form a frame with which the stanchion is pivotally connected, and is arranged to be secured to the floor of the building in which the stanchion is located, the upper ends of the beams A being extended above the upper beam B in order to permit of their being secured between rafters or overhead supports S forming a part of the building.

The stanchion proper comprises a stanchion post 1, a stanchion bar 2, an upper arm 3, a lower arm 4 and a trigger lever 5 carried by the stanchion bar and held pivotally connected therewith by a bolt 6. As clearly shown in Fig. 1, the upper and lower arms are each constructed of two pieces of timber held properly separated by spacers 7, 8 and 9, of which the first named is arranged between the members of the arm 4, and the last two named between the members of the arm 3. The spacers 7 and 8 constitute the means for receiving and holding the pintles 10 and 11, that are seated in suitable orifices in the beams B, and rotate freely therein. In order to insure free swinging movement of the stanchion, and to prevent it from grinding upon the lower beam B, a spacer in the nature of a washer 12 is placed upon the lower pintle and the lower arm 4 as clearly shown in Fig. 2.

The stanchion post 1 is rigidly connected with the arms 3 and 4, preferably by bolts 13 that pass through the stanchion post, and through the members of the arms 3 and 4, as clearly shown in Figs. 1 and 2, similar bolts 14, 15 and 16 serving to hold the spacers assembled with the arms. The lower end of the stanchion bar is held for pivotal movement between the members of the arm 4 by a bolt 17, and its upper end works between the members of the arm 3, and is limited in its swinging movement by the spacers 8 and 9.

As will be clear by reference to Figs. 1 and 2, the arm 3 is of greater length than the arm 4, and this arrangement will permit the stanchion bar to occupy the requisite angular position relative to the stanchion post when the parts are in the position shown in Fig. 1, thus to allow the animal to insert its head between the stanchion post and the stanchion bar, and when the latter bar has been shifted to the position shown in Fig. 1, it will lie parallel with the stanchion post, and thereby contract the space between the parts to such an extent as to prevent the animal from withdrawing its head.

The means for initially locking the stanchion against rotation, and for shifting the stanchion bar from the position shown in Fig. 2 to that shown in Fig. 1 consists of a shifting lever embodying the trigger 5, and a link 18, the lower end of which is pivotally connected by a bolt 19 with the short arm of the trigger, and the upper end of which loosely engages with one of the arms 20 of an approximately U-shaped stanchion bar shifter 21, the other arm 22 of which extends through an opening near the outer end of the arm 3 and through the spacer 9, and is held from disconnection therefrom by a cotter pin 23. The arm 20 works in a guide 24 that is rigidly secured to the outer edge of the stanchion bar 2, and when the stanchion bar is in locked position engages a transverse recess 25, in the under side of the arm 3, thus to permit the trigger to occupy a vertical position. To prevent the stanchion from swinging, when the parts are in the position shown in Fig. 2, there is a keeper 26 provided, which is bolted to a block 27 secured to the beam A, and between the lips 28 of which the guide is adapted to rest, as shown in Fig. 1. The coaction between the guide and keeper limits the movement of the stanchion bar in one direction, movement in the other direction being checked by means of a lug or projection 29 carried by the short arm of the trigger 5, and arranged to engage with the face of the stanchion bar, as shown in Fig. 1. This form of locking mechanism will be found thoroughly efficient in use, and by reason of the simplicity of its construction danger of derangement in use is reduced to the minimum. Furthermore weakening of the upper arm 3 by providing the same with a longitudinal slot to receive the upper end of the stanchion bar is obviated, thereby measurably to strengthen the structure as a whole.

When the stanchion is set, as shown in Fig. 1, the animal will thrust its head in between the stanchion post and the stanchion bar above the trigger 5, and in so doing its throat will drag over the latter, thereby depressing it. It will be observed that the pivotal point of the trigger, with reference to the stanchion bar, is at such distance from the center as to cause that portion of the trigger that normally bridges the space between the stanchion bar and the stanchion post to be counterweighted, so that as soon as the animal has pushed the trigger down a sufficient distance to cause it to lie slightly below a horizontal plane, the weighted end will, by the force of gravity, drop, and thereby impart an upward movement to the link 18 which will cause the arm 20 of the shifter 21 to ride upward in the guide 24 and thereby move the stanchion bar to the position shown in Fig. 1, in full lines, this movement of the parts releasing the guide from engagement with the keeper and thus leaving the stanchion free to move pivotally, so that the animal can readily reach to the right or left for the food provided for it. When the stanchion bar is in the position shown in Fig. 1, it will be held against yielding from lateral pressure, as from the animal's neck, by the arm 20 of the shifter, which will be borne upon by the upper end of the stanchion bar, the arm being prevented from yielding by the recess 25, so that any strains applied to the stanchion bar will be transmitted to the arm of the shifter, thereby securing the object sought.

To set the stanchion, and at the same time release the animal, it will only be necessary to swing the trigger upward until the stanchion bar passes a vertical line, whereupon it will drop to the angular position shown in Fig. 2, and hold the trigger in the position therein shown, and at the same time project the guide into the keeper 26.

The advantage arising from having the stanchion made as a self-contained structure is, that should it be desired at any time, in a large establishment, to provide an alleyway at any particular part of the barn, the frames necessary to secure the result may readily be removed along with the stanchion, it being understood that the vertical beams of two adjacent stanchions will be bolted together. It is furthermore to be understood that it is designed to manufacture the stanchions and ship them ready to set up, and thereby materially lessen the labor required to equip a cow barn with structures of this character.

It will be seen from the foregoing description, that although the improvements herein defined are simple in character, that they will be thoroughly efficient for the purposes designed and will coöperate in the production of a highly efficacious and durable structure.

I claim:—

The combination with a supporting frame, of a stanchion pivotally supported thereby and comprising upper and lower arms, a stanchion post rigid therewith, a stanchion bar pivotally connected with the lower arm, a trigger carried by the stanchion bar, an approximately U-shaped shifter pivotally connected to the upper arm, a guide carried by the stanchion bar through which one member of the shifter projects, a keeper carried by the frame and arranged to be engaged by the guide to lock the stanchion against rotation, a link pivotally connected with the trigger and the shifter, the under side of the upper arm being provided with a recess to receive the upper end of the link and of the shifter member with which it coacts to lock the stanchion bar against lateral movement when the trigger is released.

In testimony that I claim the foregoing as my own, I have hereto affixed my signature in the presence of two witnesses.

EDWARD W. JOHNSON.

Witnesses:
F. B. OCHSENREITER,
C. E. DOYLE.

Copies of this patent may be obtained for five cents each, by addressing the "Commissioner of Patents, Washington, D. C."